(12) United States Patent
Kremer et al.

(10) Patent No.: US 9,109,641 B2
(45) Date of Patent: Aug. 18, 2015

(54) FORMED FRICTION PLATE FOR WET FRICTION CLUTCH

(71) Applicant: GM Global Technology Operations LLC, Detroit, MI (US)

(72) Inventors: John M. Kremer, Sterling Heights, MI (US); Charles S. Davis, Livonia, MI (US); Jeffrey J. McFarland, Commerce, MI (US); Larry D. Diemer, Clarkston, MI (US)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 43 days.

(21) Appl. No.: 14/061,003

(22) Filed: Oct. 23, 2013

(65) Prior Publication Data

US 2014/0158494 A1     Jun. 12, 2014

Related U.S. Application Data

(60) Provisional application No. 61/734,684, filed on Dec. 7, 2012.

(51) Int. Cl.
*F16D 13/64*     (2006.01)
*F16D 25/063*    (2006.01)

(52) U.S. Cl.
CPC ............ *F16D 13/648* (2013.01); *F16D 25/063* (2013.01)

(58) Field of Classification Search
CPC ..... F16D 13/64; F16D 13/648; F16D 25/062; F16D 25/063; F16D 2300/10
See application file for complete search history.

(56) References Cited

U.S. PATENT DOCUMENTS

| | | | | |
|---|---|---|---|---|
| 2,587,837 | A * | 3/1952 | Goodwin | 192/107 C |
| 2,927,673 | A * | 3/1960 | Sand | 192/70.14 |
| 3,063,530 | A * | 11/1962 | Rosenberger et al. | 192/70.14 |
| 7,806,245 | B2 * | 10/2010 | Oh | 192/70.14 |
| 8,286,773 | B2 * | 10/2012 | Nakamura et al. | 192/70.14 |
| 2003/0150686 | A1 * | 8/2003 | Kremer | 192/70.14 |
| 2004/0065521 | A1 * | 4/2004 | Watanabe et al. | 192/70.14 |

* cited by examiner

*Primary Examiner* — Jacob S Scott

(57) ABSTRACT

A friction clutch pack exhibiting improved high speed stability includes a first plurality of friction plates or discs preferably having friction material on both faces interleaved with a second plurality of thicker reaction plates or discs. The friction plates comprise a formed core plate having multiple obliquely oriented or angularly offset sinusoidal waves. Male splines around the periphery of each friction plate engage complementary splines on a cylindrical housing. The reaction plates are flat and thicker than the friction plates and include female splines around an inner opening which engage complementary splines on a shaft or quill.

18 Claims, 3 Drawing Sheets and discs connected to respective input and output members, are nearly universal components of modern multiple planetary gear automatic motor vehicle transmissions. The

FORMED FRICTION PLATE FOR WET FRICTION CLUTCH

CROSS REFERENCE TO RELATED APPLICATION

This patent application claims the benefit of U.S. Provisional Patent Application Ser. No. 61/734,684, filed Dec. 7, 2012, which is hereby incorporated in its entirety herein by reference.

FIELD

The present disclosure relates to friction plates for wet clutches and more particularly to friction plates for wet friction clutches having improved high speed stability and performance.

BACKGROUND

The statements in this section merely provide background information related to the present disclosure and may or may not constitute prior art.

Wet friction clutches, or more properly wet friction clutch packs, which comprise a first plurality of friction plates or discs interleaved with a second plurality of thicker reaction plates or discs connected to respective input and output members, are nearly universal components of modern multiple planetary gear automatic motor vehicle transmissions. The activation or relaxation or one or typically more than one such clutch in a predetermined sequence, steps the transmission through upshifts and downshifts.

Frequently during such operation, wet friction clutches are subjected to relatively high differential, i.e., input to output, speeds. In certain clutches and certain applications, dramatically increased spin losses have been observed when the differential speed increases beyond a certain magnitude. This non-linear spin loss increase has been attributed to instabilities of the rotating friction plates which result from gyroscopic tumbling of the plates.

The use of core plates with a shallow circumferential sinusoidal profile is state of the art for spin loss reduction at low relative (differential) speeds. However, it is believed that this approach is unsatisfactory at high relative speeds because the sinusoidal geometry essentially conforms to the first deformation mode of the plates.

There have been many other proposed solutions to this problem, all of which lead to other inefficiencies or difficulties.

The present invention is directed to an improved friction clutch configuration that reduces high differential speed instabilities and spin losses.

SUMMARY

The present invention provides a friction clutch pack having a first plurality of friction plates or discs preferably having friction material on both faces interleaved with a second plurality of thicker reaction plates or discs. The friction plates comprise a formed core plate having multiple obliquely oriented or angularly offset sinusoidal waves. Male splines around the periphery of each friction plate engage complementary splines on a cylindrical housing. The reaction plates are flat and thicker than the friction plates and include female splines around an inner opening which engage complementary splines on a shaft or quill. Of course, the invention comprehends a friction clutch pack in which the male splines are disposed on the reaction plates and the female splines are disposed on the friction plates or discs. A friction clutch pack assembly incorporating friction plates or discs according to the present invention exhibits improved high differential speed stability and reduced spin losses.

Thus it is an aspect of the present invention to provide a friction clutch pack which exhibits improved high differential speed performance.

It is a further aspect of the present invention to provide a friction clutch pack which exhibits reduced high differential speed instability and spin loss.

It is a still further aspect of the present invention to provide a friction clutch pack having friction plates which include a core plate with multiple angularly offset sinusoidal waves.

It is a still further aspect of the present invention to provide a friction clutch pack having friction plates which include a core plate with multiple obliquely oriented sinusoidal waves.

It is a still further aspect of the present invention to provide a friction clutch pack having friction plates which include a core plate with angularly offset sinusoidal waves and friction material affixed thereto.

It is a still further aspect of the present invention to provide a friction clutch pack having friction plates which include a core plate with obliquely oriented sinusoidal waves and friction material affixed thereto.

It is a still further aspect of the present invention to provide a friction clutch pack having friction plates which include a core plate with angularly offset sinusoidal waves and male splines disposed about its periphery.

It is a still further aspect of the present invention to provide a friction clutch pack having friction plates which include a core plate with obliquely oriented sinusoidal waves and male splines disposed about its periphery.

It is a still further aspect of the present invention to provide a friction clutch pack having flat reaction plates which include female splines disposed within an inner opening.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
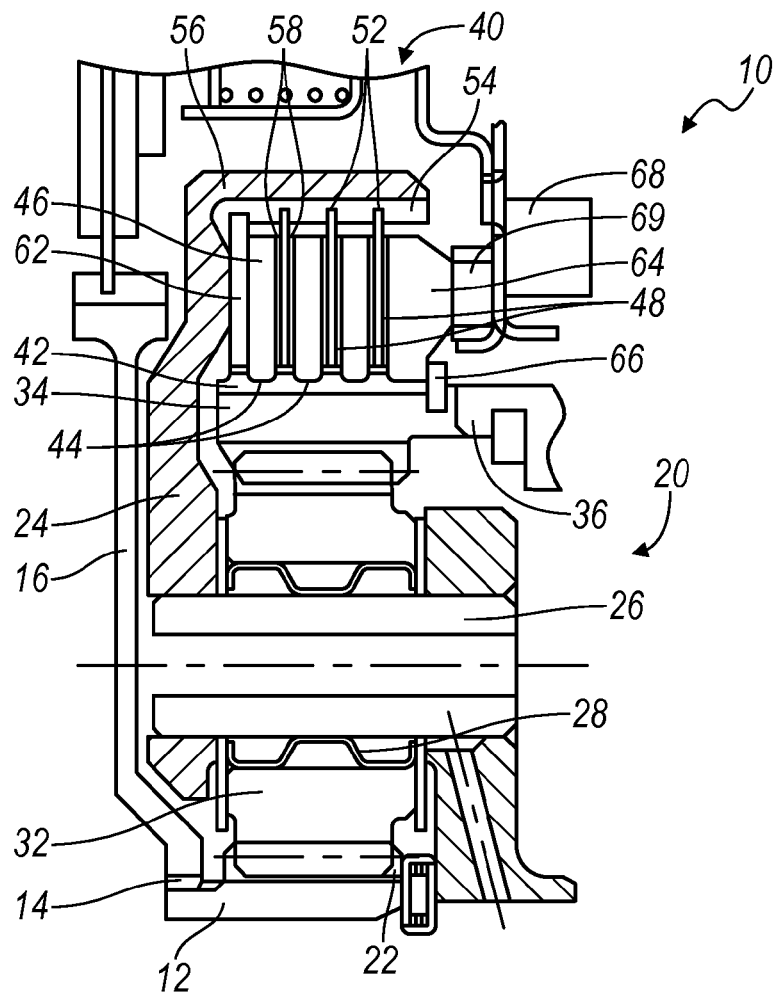
FIG. 1 is a sectional view of a portion of an automatic motor vehicle transmission including a wet friction clutch pack and operator incorporating the present invention.

With reference to FIG. 1, a portion of an automatic motor vehicle transmission is illustrated and generally designated by the reference number 10. The automatic transmission 10 typically includes a plurality of nested, concentric shafts and quills, one of which, a first quill 12, is illustrated in FIG. 1, a plurality of planetary gear assemblies, one of which, a first planetary gear assembly 20 is illustrated in FIG. 1 and a plurality of friction pack clutch assemblies, one of which, a first friction pack clutch assembly 40 is also illustrated in FIG. 1. The first quill 12 is coupled through interengaging male and female splines 14 to a stationary or rotating drive plate or disc 16 and defines a sun gear 22 of the first planetary gear assembly 20. The first planetary gear assembly 20 also includes a planet gear carrier 24 which supports a plurality of shafts 26 (one of which is illustrated in FIG. 1) which, in turn, support a like plurality of needle bearing assemblies 28 and a respective plurality of planet gears 32 (one of both being illustrated in FIG. 1). The planet gears 32 are in constant mesh with the sun gear 22 and a ring gear 34. The ring gear 34 is secured to an adjacent circular member 36 of the transmission 10 which may be a drive member, a driven member or a stationary member.

The planetary gear assembly 20 just described is a simple planetary gear assembly (having a single planet gear 32 between the sun gear 22 and ring gear 34). It should be appreciated that the invention is not limited for use therewith and that a compound planetary gear assembly (having pairs of planet gears between the sun gear and ring gear) is also wholly suitable for use with the present invention.

Figure 5:
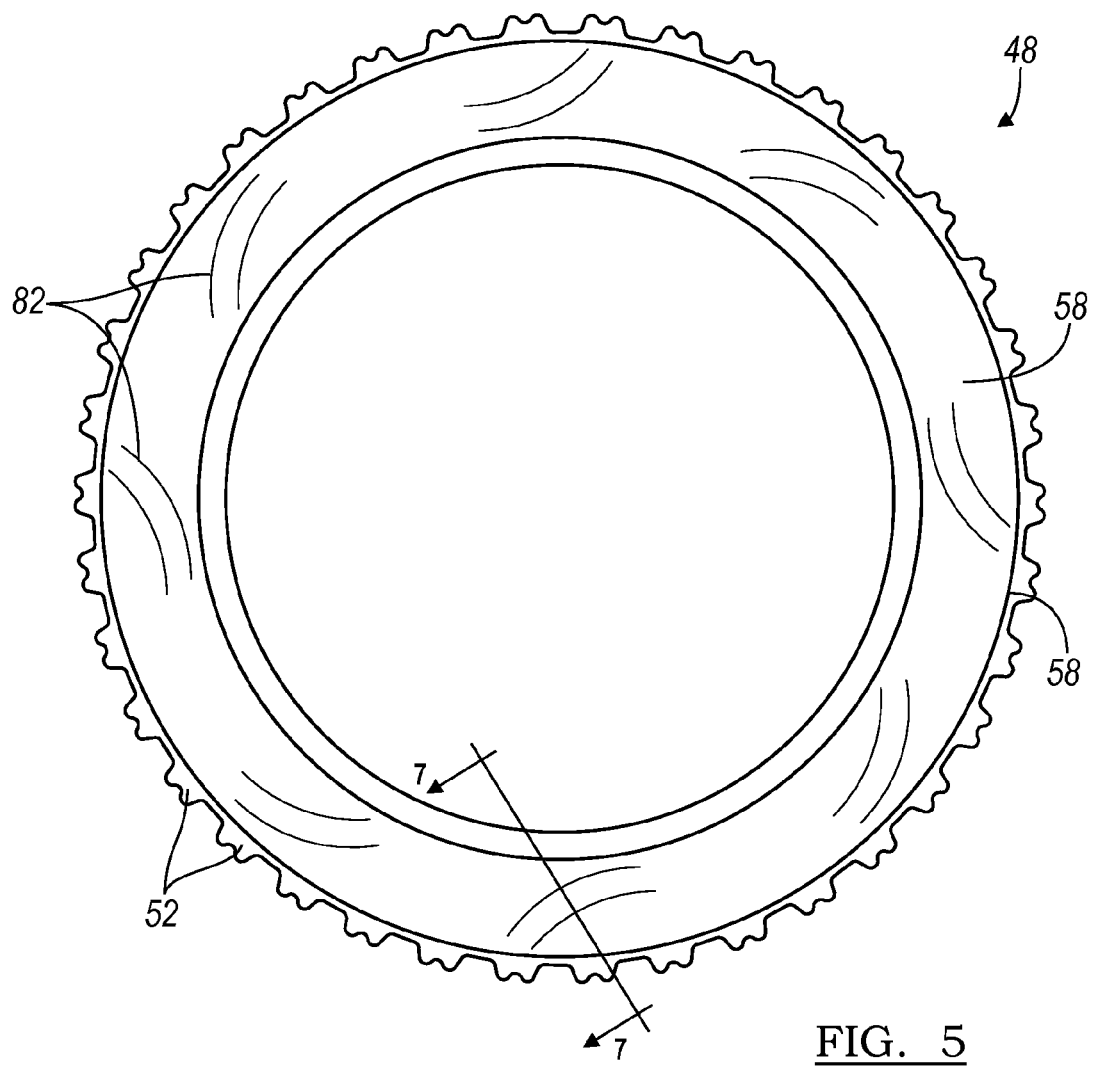
FIG. 5 is a plan view of a friction plate according to the present invention having angularly offset or obliquely oriented sinusoidal waves.

The friction clutch pack assembly 40 is disposed outside and generally in radial alignment with the first planetary gear assembly 20. The outer surface of the ring gear 34 includes male splines 42 which are engaged by complementary female splines 44 on a plurality of reaction plates 46. Interleaved with the reaction plates 46 are a plurality of friction plates or discs 48. The friction plates or discs 48, which are often referred to as a core since friction material is generally attached to one or both surfaces or faces thereof, include male splines 52 which are engaged by complementary female splines 54 on the inner surface of an axially extending flange or shoulder 56 of the planet gear carrier 24. As best illustrated in FIG. 5, the friction plates or discs 48 include an annulus or band of friction material 58 on each face or surface.

It should be understood that with regard to the plurality of reaction plates 46 having a smaller diameter and internal (female) splines 44 and the plurality of interleaved friction plates or discs 48 of somewhat larger diameter having external (male) splines 52 described directly above, the relative diameters and locations of the splines may be interchanged such that the reaction plates have a larger diameter and external (male) splines which engage a shoulder or a housing and the friction plates or discs have a smaller diameter and internal (female) splines which engage a gear, a shaft or a hub.

At one end of the interleaved reaction plates 46 and clutch plates 48, the left end in FIG. 1 (adjacent the wall of the planet gear carrier 24), is a circular backing plate 62 against which the plates 46 and 48 are compressed. At the opposite end of the interleaved plates 46 and 48, to the right in FIG. 1, is an apply plate 64 which is retained in position by a snap ring 66 or similar component. The apply plate 64 evenly applies compressive force to the interleaved clutch plates 46 and 48 generated by, for example, a hydraulic or electric operator 68 which is transmitted through a thrust bearing 69 to the apply plate 64.

It will be appreciated that the foregoing description of a location and application for the present invention is exemplary and illustrative only. It should be understood that the present invention will find wide application in any power transmission device of any nature in which friction clutch pack assemblies are utilized.

Figure 4:
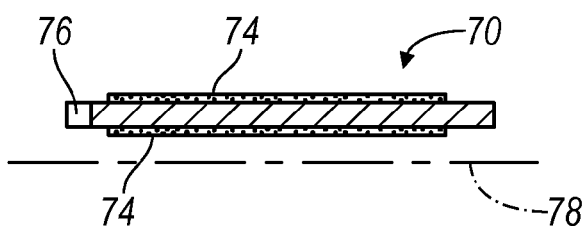
FIG. 4 is an enlarged, full sectional view of a prior art friction plate having sinusoidal waves aligned with geometric axes, i.e., lines of radius, of the plate taken along line 4-4 of FIG. 2.
Figure 2:
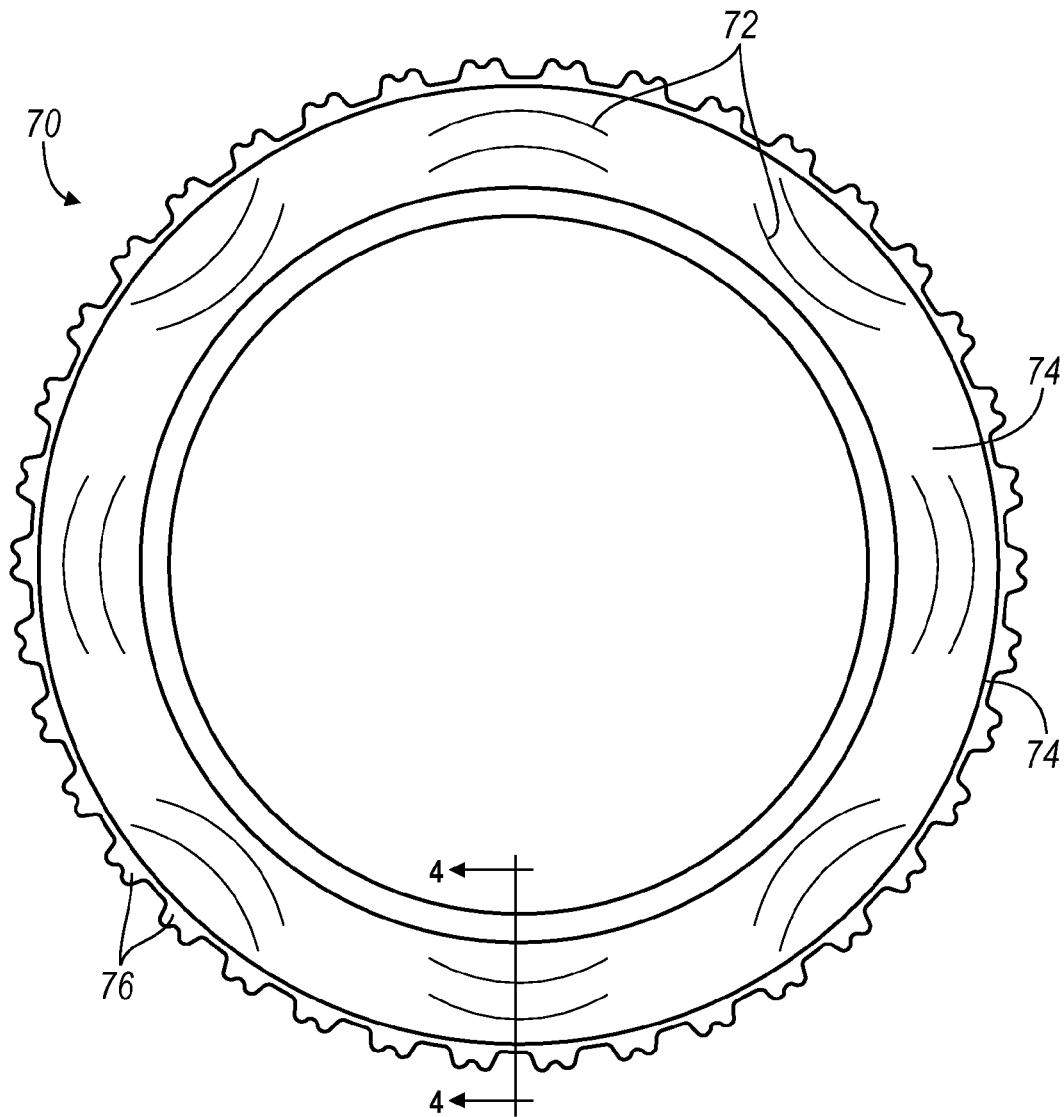
FIG. 2 is a plan view of a prior art friction plate having sinusoidal waves aligned with geometric axes, i.e., lines of radius, of the plate.
Figure 3:
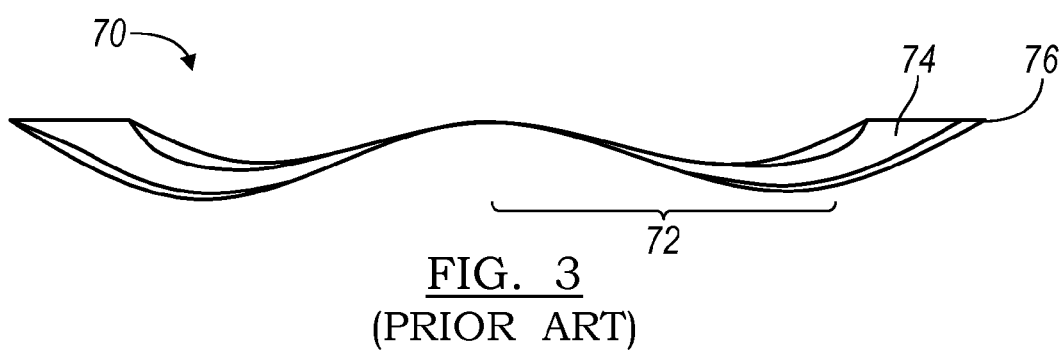
FIG. 3 is a side elevational view of the front half of a prior art friction plate having sinusoidal waves aligned with geometric axes, i.e., lines of radius, of the plate.

Referring now to FIGS. 2, 3 and 4, a prior art friction plate or disc 70 is illustrated. The friction plate or disc 70, according to previous practice, includes sinusoidal curves or waves 72 that align with the geometric axes of the disc, that is, with lines of radius. The prior art friction plate or disc 70 typically includes friction material 74 on both faces and male splines 76 about its periphery. The edge-on view of FIG. 3 clarifies that the arrangement of the sinusoidal waves or curves 72 of the prior art friction plate or disc 70 are like those of a conventional wave washer. FIG. 4 also illustrates this orientation of the waves 72 in the prior art friction plate or disc 70 whereby a radial cutting plane, the line 4-4 of FIG. 2, reveals that the displaced or offset wave 72 is at an essentially constant axial offset from the nominal plane 78 of the plate or disc 70 along a line of radius.

It should be appreciated that the extent of axial offset, that is, the height of the sinusoidal waves or curves 72 has been exaggerated for purposes of explanation in the foregoing drawing figures.

Unfortunately, as noted above, this conventional, prior art arrangement of the sinusoidal waves or curves 72 essentially conforms to the first mode of structural vibration and deformation of the prior art plate or disc 70, exciting the first order resonant frequency of the plate or disc 70 and thus exacerbates rather than cures or reduces the problem of friction plate deformation and increased drag at high differential rotational speeds.

Figure 7:
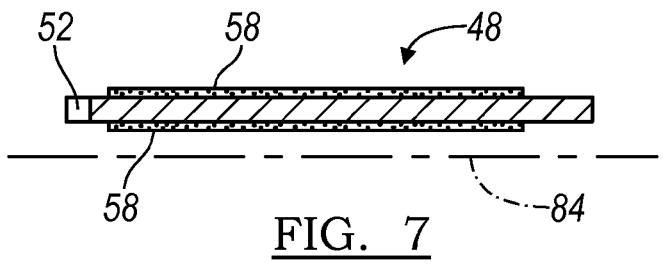
FIG. 7 is an enlarged, full sectional view of a friction plate according to the present invention having angularly offset or obliquely oriented sinusoidal waves taken along line 7-7 of FIG. 5.
Figure 6:
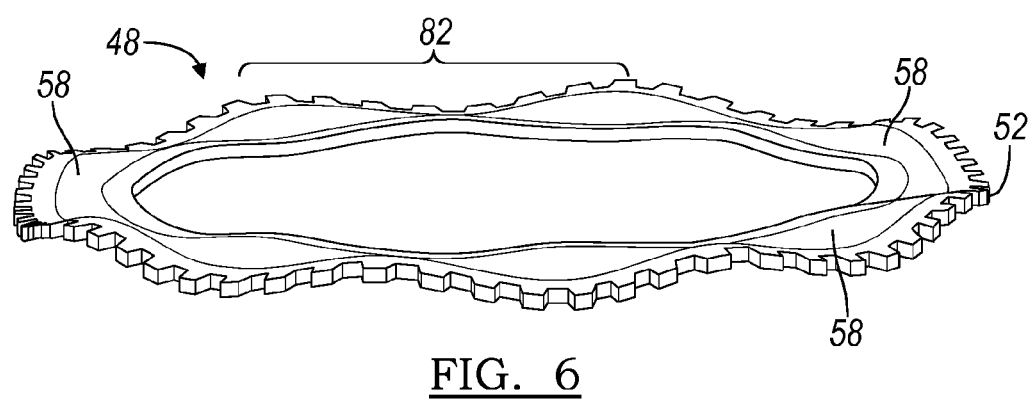
FIG. 6 is a side elevational view of a friction plate according to the present invention having angularly offset or obliquely oriented sinusoidal waves.

Referring now to FIGS. 5, 6 and 7, the friction plate or disc 48 according to the present invention is illustrated. Here, the sinusoidal waves or curves 82 are angularly offset or obliquely oriented relative to lines of radius. Thus, as illustrated in FIG. 6, the waves or curves 82 do not align with radial lines. With regard to FIG. 7, note the oblique or angular orientation of the cutting plane 7-7 in FIG. 5 which, in a manner similar to FIG. 4, presents the axially displaced or offset wave 82 at an essentially constant distance from the nominal plane 84 of the plate or disc 48. Once again, it should be appreciated that the extent of axial offset, that is, the height of the sinusoidal waves or curves 82 has been exaggerated for purposes of explanation in FIGS. 6 and 7.

The angle of offset of the sinusoidal waves or curves 82 in FIGS. 5, 6 and 7 is 45° but it should be understood that this angle may be adjusted over a relatively wide range, for example, 30° to 60° of offset from a line of radius and possibly wider depending upon engineering variables relating to the friction clutch pack assembly 40 and the friction clutch plates or discs 48 such as their maximum speed, both engaged and disengaged, the thickness, stiffness and material of the friction plate or disc 48, the type and thickness of the friction material 58 and other variables. Similarly, the number of sinusoidal waves or curves 82 may be greater or lesser than the four illustrated in FIGS. 5, 6 and 7. For example, three, five, six, eight, ten or twelve waves or curves 82 may be formed in a plate or disc 48. Typically, smaller numbers of waves or curves 82 will be utilized with relatively smaller diameter plates or discs 48 and larger numbers of waves or curves 82 will be utilized with relatively larger diameter plates or discs 48.

The description of the present invention is merely exemplary in nature and variations that do not depart from the gist of the invention are intended to be, and are, within the scope of the invention. Such variations are not to be regarded as a departure from the spirit and scope of the invention.

We claim:

1. A friction clutch pack having reduced spin loss comprising, in combination,
    an inner hub having an outer surface defining a plurality of axially extending male splines,
    an outer member having an inner surface defining a plurality of axially extending female splines,
    a plurality of reaction plates having a plurality of female splines complementary to and engaged by said plurality of male splines, and
    a plurality of friction plates having opposed surfaces and including friction material disposed on said surfaces, said plurality of friction plates defining a plurality of sinusoidal waves angularly offset from lines of radius.

2. The friction clutch pack of claim 1 further including an actuator for compressing said pluralities of reaction plates and friction plates and transferring torque from said inner hub to said outer member.

3. The friction clutch pack of claim 2 further including an apply plate and a thrust bearing disposed between said actuator and said pluralities of reaction plates and friction plates.

4. The friction clutch pack of claim 1 wherein said friction clutch pack is a wet friction clutch pack.

5. The friction clutch pack of claim 1 wherein said inner hub is a ring gear of a planetary gear assembly and said outer member is a planet gear carrier of said planetary gear assembly.

6. The friction clutch pack of claim 1 wherein said angle of offset of said plurality of sinusoidal waves is from about 30° to about 60° from a line of radius.

7. The friction clutch pack of claim 1 wherein said plurality of friction plates are core plates.

8. A friction clutch pack having improved stability comprising, in combination,
    an inner hub having an outer surface defining a plurality of axially extending male splines,
    an outer member having an inner surface defining a plurality of axially extending female splines,
    a plurality of flat reaction plates having a plurality of female splines complementary to and engaged by said plurality of male splines,
    a plurality of friction plates having opposed surfaces and including friction material disposed on said surfaces, said friction plates defining a plurality of sinusoidal waves angularly offset from lines of radius, and
    an actuator for compressing said pluralities of reaction plates and friction plates.

9. The friction clutch pack of claim 8 further including an apply plate and a thrust bearing disposed between said actuator and said pluralities of reaction plates and friction plates.

10. The friction clutch pack of claim 8 wherein said friction clutch pack is a wet friction clutch pack.

11. The friction clutch pack of claim 8 wherein said inner hub is a ring gear of a planetary gear assembly and said outer member is a planet gear carrier of said planetary gear assembly.

12. The friction clutch pack of claim 8 wherein said angle of offset of said plurality of sinusoidal waves is from about 30° to about 60° from a line of radius.

13. The friction clutch pack of claim 8 wherein said plurality of friction plates are core plates.

14. A formed friction plate for a wet friction clutch pack comprising, in combination,
    a core plate having a first face, a second face, a center opening and an outer edge,
    a plurality of splines disposed about one of said center opening and said outer edge,
    a band of friction material secured to said first face and said second face, and
    a plurality of sinusoidal waves defined by said core plate, said waves obliquely oriented to lines of radius.

15. The formed friction plate of claim 14 wherein said plurality of splines are male and are disposed about said outer edge.

16. The formed friction plate of claim 14 wherein said plurality of sinusoidal waves is from approximately 30° to approximately 60° from a line of radius.

17. The formed friction plate of claim 14 wherein said plurality of sinusoidal waves includes between three and eight said waves.

18. The formed friction plate of claim 14 wherein a plurality of said core plates and a plurality of reaction plates are disposed in a wet friction clutch pack.

\* \* \* \* \*